United States Patent [19]
Walter et al.

[11] Patent Number: 4,511,188
[45] Date of Patent: Apr. 16, 1985

[54] BALL BEARING FOR LENGTHWISE AND TURNING MOVEMENT

[75] Inventors: Lothar Walter, Schweinfurt; Walter Reith, Bad Bocklet, both of Fed. Rep. of Germany

[73] Assignee: SKF GmbH, Schweinfurt, Fed. Rep. of Germany

[21] Appl. No.: 491,050

[22] Filed: May 3, 1983

[30] Foreign Application Priority Data

May 3, 1982 [DE] Fed. Rep. of Germany ....... 3216440

[51] Int. Cl.³ .............................................. F16C 29/06
[52] U.S. Cl. ................................................... 308/6 C
[58] Field of Search .............. 308/6 C, 6 R, 6 A, 198; 464/168

[56] References Cited

U.S. PATENT DOCUMENTS

| | | | |
|---|---|---|---|
| 2,624,644 | 1/1953 | Bryant | 308/198 |
| 4,181,374 | 1/1980 | Ernst et al. | 308/6 C |
| 4,361,366 | 11/1982 | Uchiyama | 308/6 C |

Primary Examiner—Lenard A. Footland
Attorney, Agent, or Firm—Daniel M. Rosen

[57] ABSTRACT

A ball bearing for lengthwise and rotational movement on a shaft has circumferentially distributed endless rows of balls. It consists of an outer sleeve with an axially extending cylindrical race in its bore for the loaded balls of each row and a sleeve-shaped cage rotatably arranged in the bore of the outer sleeve. The cage has axially extending races for the loaded and unloaded balls and these guides are interconnected in pairs by semi-circular shaped radially outwardly open turnaround races. An axially extending return recess for the unloaded balls of each row is machined between each pair of cylindrical races, either in the cylindrical bore of the outer sleeve or on the cylindrical shaft. In order to avoid contact wear of the balls in the turnaround races upon turning movement of the shaft, the cage is held at its two ends by an end ring having an outer section radially covering the turnaround guides of the cage.

6 Claims, 4 Drawing Figures

BALL BEARING FOR LENGTHWISE AND TURNING MOVEMENT

This invention relates to a bearing for lengthwise and turning movement on a shaft.

In a known ball bearing of this type, semi-circular turnaround races at each end of the cage are outwardly covered by an annular radial turnaround recess machined in the bore of the outer sleeve, so that the balls are held in the turnaround race (DE-DS 1213174). This known ball bearing has the disadvantage that the balls in the turnaround races contact the hard walls of the turnaround recesses in the bore of the outer sleeve, which move in one or the other direction relative to the cage, depending on the turning direction of the shaft. The resulting sliding friction on these ball guiding walls can abrade the balls.

As a consequence rubbing forces act on the balls, which destroy the uniform circulation of the balls in each row, and causes an annoying running noise in operation.

It is an object of the invention to provide a ball bearing for lengthwise and turning movement of the above type, which has a relatively small contact wear of the balls in the region of the turnaround zone of the cage, especially during any of the frequent rotating movements of the shaft. The ball bearing in addition must have a minimum running noise.

Briefly stated, in accordance with the invention, a ball bearing for lengthwise and turning movement is provided in which the balls are uniformly outwardly guided in the turnaround race of the cage (without relative movement of the covering wall), independently of the turning direction and the turning speed of the shaft, and are covered. In this manner a collision-free low-wear circulation of the balls of each row in the guides and turnaround zones of the cage is thereby provided.

In a further embodiment of the invention the cage absorbs axial loads in operation without additional loading of the balls and can pass then on to the outer sleeve by way of its inner facing surface on the shoulder surface of the respective turnaround recess. In this manner the races of the balls of each row are not destroyed by the eventual axial forces on the cage in operation. In addition, relatively small axial play between the axially inner facing surface of the end ring and the opposite shoulder surface of the outer sleeve is possible, so that the cage can have only minimal axial relative movement with respect to the outer sleeve. As a consequence there is an advantageous quiet running of the ball bearing.

In a further embodiment, the turnaround race of the cage is protected from damaging dust or the like of the environment of the bearing, in front of the end ring. At the same time the lubricant material, such as grease, is held within the inner space of the ball bearing. Together with the previously discussed embodiment this feature provides the advantage that the sliding space between the axially inner facing surface of the end ring and the opposite shoulder surface of the outer sleeve can pass no dirt from the bearing environment which would otherwise cause damaging abrading wear.

In order that the invention will be more clearly understood, it will now be disclosed in greater detail with reference to the accompanying drawings, wherein.

Figure 1:
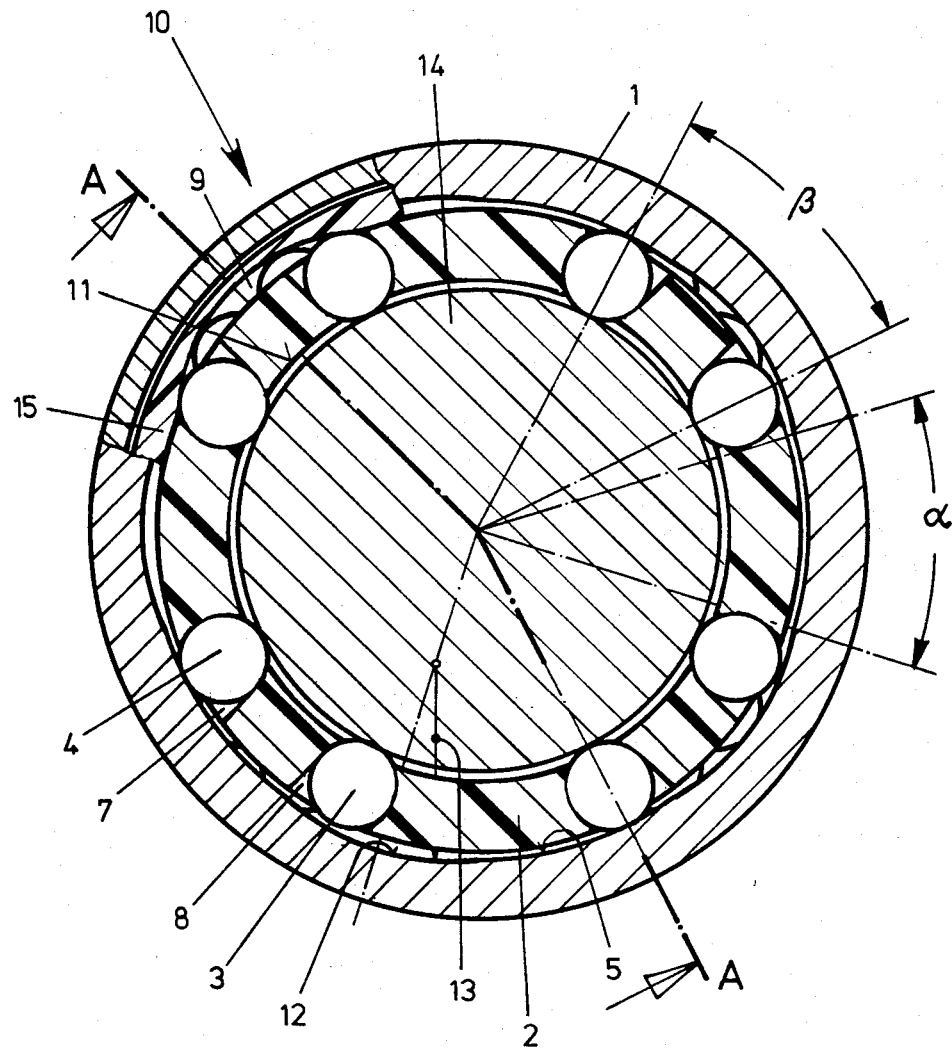
FIG. 1 is a transverse cross-sectional view of a bearing for lengthwise and rotating movement, in accordance with the invention.
Figure 2:
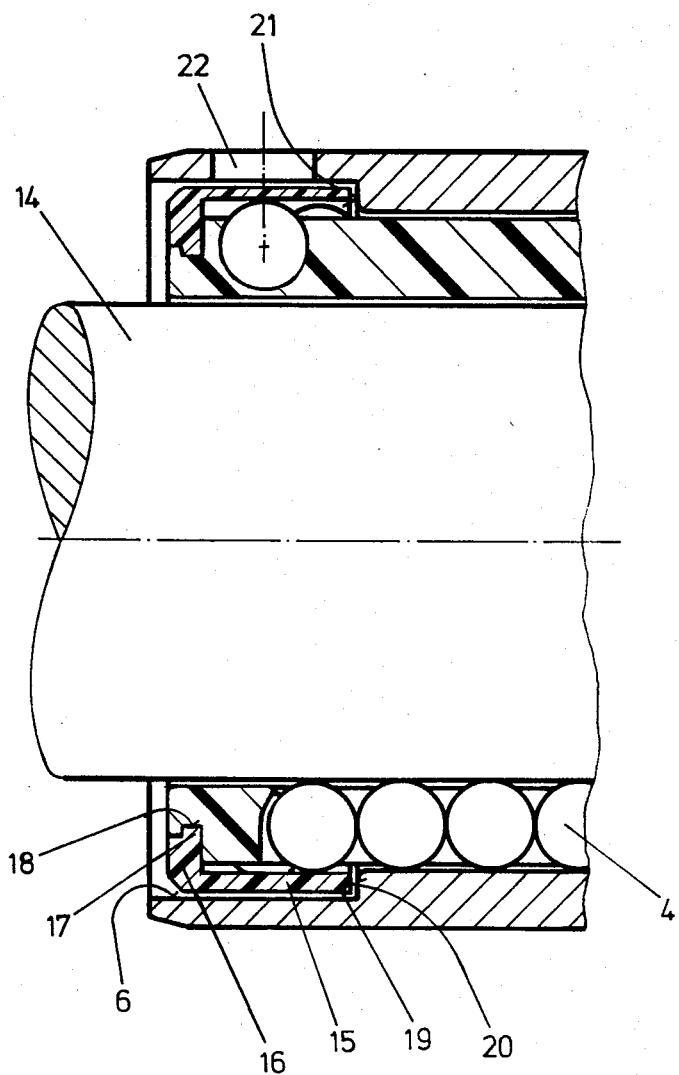
FIG. 2 is a portion of a cross-sectional view of the ball bearing of FIG. 1, taken along the lines A—A.

The ball bearing of the invention as illustrated in FIGS. 1 and 2 is comprised of an outer sleeve 1 of rolling bearing steel or the like and a sleeve-shaped cage 2 rotatable held in the bore of the outer sleeve 1. The sleeve 2 may be made of a plastic material. The ball bearing has four circumferentially distributed endless rows of balls 3, 4.

The outer sleeve 1 has axially extending concentric cylindrical races 5 for the loaded balls 4 equally distributed about the circumference of its bore. The two ends of each of these races 5 terminate in an annular radial reversing or turnaround recess 6 which is machined in the bore of the outer sleeve 1.

The cage 2 had axially extending guides 7 for the loaded balls 4 and axially extending guides 8 for unloaded balls of each endless row of balls alternately distributed about its circumference. Guides 7 and 8 are connected to one another in pairs at their ends by semicircular reversing guides 9 of the cage 2. The reversing guides 9 of the cage 2 are radially outwardly open. They have, as is apparent in the broken away section 10 of FIG. 1, an outwardly curved base section 11 having a cross-section that is a section of a circle, which radially outwardly guides the balls 3, 4 in their course in the guides 7, 8 and respective reversing guide 9.

In the above example an axially extending return recess 12 for the unloaded balls 3 is arranged in the bore of the outer sleeve 1 between each pair of two cylindrical races 5. The return recesses 12, which can be machined in the initially complete cylindrical bore of the outer sleeve 1 by milling, have cross-sections that are sections of a circle so that the bottom of each return track recess 12 has a radius 13. The width of each return recess 12 in the circumferential direction is approximately as large as the width of the cylindrical races which define the circumferential angle $\alpha$.

The circumferential space of the axially extending guides 7 from the respective axially extending guides 8 of each row of balls 3, 4 is fixed at a circumferential angle $\beta$ which is approximately as large as the circumferential angle $\alpha$. Upon rotation of the cylindrical shaft 14 and the corresponding rotation of the cage 2 with respect to the outer sleeve 1, the force distribution on the illustrated balls 3, 4 in FIG. 1 changes in a known manner. Namely, the loaded balls 4 then arrive under the neighboring return recesses 12 of the outer sleeve 1 and are consequently unloaded. At the same time the unloaded balls move under the cylindrical races 5 of the outer sleeve 1 and are then loaded.

At its two ends the cage 2 is rigidly connected to an outer section 15 of outer covering end ring 16 at each of its reversing races 5. The two end rings 16 of the ball bearing can be made of an elastic plastic material. Each end ring 16 is held fast to the cage 2 with an interference fit, by snapping the radial projection 17 on its end in a groove 18 machined in the outer surface of the cage 2.

The outer section 15 of each end ring 16 is sleeve shaped and extends radially into the corresponding return recess in the bore of the outer sleeve 1. The outer sleeve 1 is formed with a narrow sealing space 19 between the cylindrical outer surface of the outer section 15 of each end ring and the radially inwardly directed cylindrical wall at the base of the respective return recess 6 of the outer sleeve 1.

The outer section 15 of each end ring 16 that projects radially into the corresponding turnaround recess 6 of the outer sleeve 1, is provided with an axially inwardly facing surface 20 that slides on one of the axially inward shoulder surfaces 21 of the turnaround recess 6 of the outer sleeve 1. Both of the turnaround recesses 6 of the outer sleeve 1 are in the form of a cylindrical axially outwardly open groove. The cage 2 is thus held fast in the bore of the outer sleeve 1 by the two end rings 16 without the aid of a spring ring of the like.

In the above case a radially extending filling opening 22 is machined in the outer sleeve 1, which has a diameter at least as large as the diameter of the balls 3, 4. The filling opening 22 is arranged in the region of the turnaround race 9 of the cage 2.

In the assembly of the ball bearing, the first one of the two end rings 16 is shoved on the cage 2 and snapped with an interference fit with its projection 17 in the groove 18 of the cage 2. Next, the cage 2 is shoved axially in the outer sleeve 1 with the end upon which an end ring has not been fit, until the end ring 16 already affixed to the cage contacts the respective shoulder surface 21 of the outer sleeve with its facing surface 20. Then the filling opening 22 is brought into alignment with one of the turnaround races 9 of the cage by turning of the cage 2 in the outer sleeve 1, and the balls 3, 4 are loaded into this return race until a complete endless row of balls has been loaded into the respective race. The guides 7, 8 which narrow inwardly guide surfaces in a known manner so that the inserted balls cannot fall radially inwardly from the cage. The filling opening 22 is turned over each of the turnaround races 9 of the respective end of the cage 2 and the ball bearing is completed with the endless rows of balls 3, 4 distributed about the bearing circumference. To finish the assembly, the other end ring 16 is pushed axially inwardly on the cage 2 on the side of the filling opening 22 and snapped in the respective groove 18. Consequently the outer section 15 of the end ring 16 comes between the outer ring 1 and the cage 2 and closes the filling opening 22 so that the balls 3, 4 cannot fall outwardly therethrough.

Figure 3:
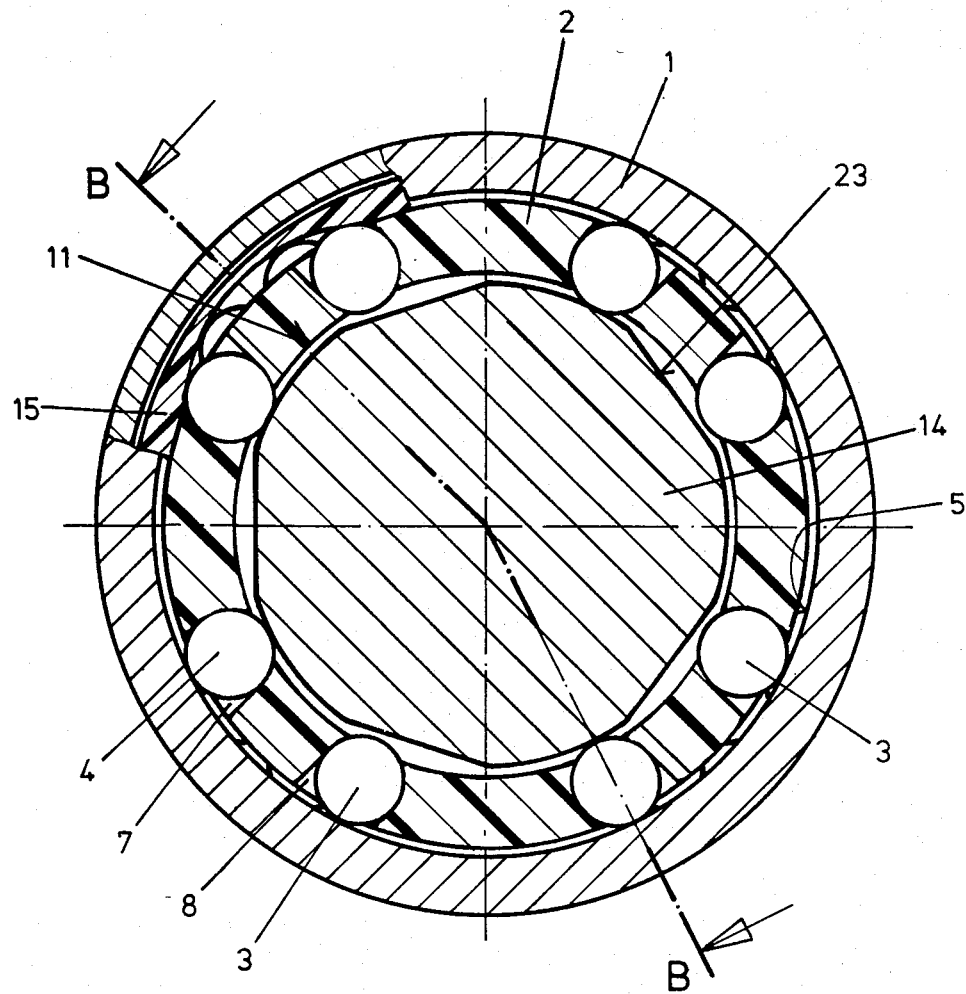
FIG. 3 is a transverse cross-sectional view of a modification of the ball bearing for lengthwise and rotating movement.
Figure 4:
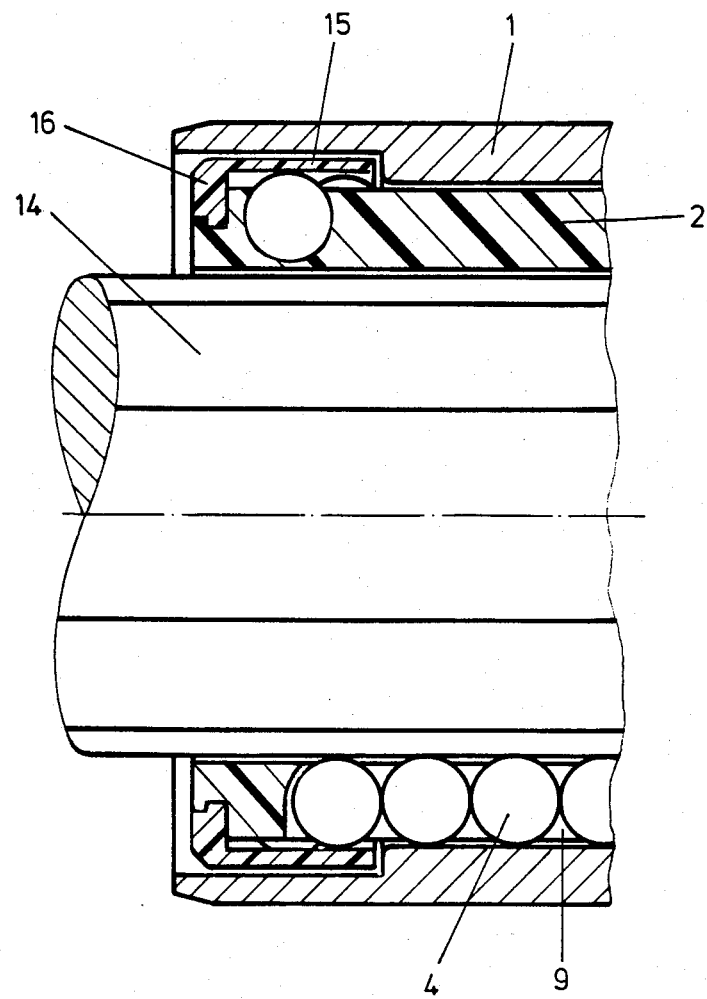
FIG. 4 is a portional longitudinal section of the bearing of FIG. 3, taken along the lines B—B.

FIGS. 3 and 4 illustrate a modification of the ball bearing for lengthwise and turning movement, which is formed in a manner similar to the above described ball bearing. The cage 2 is similarly connected fast at its end with an end ring 16, which has an outward section 15 outwardly covering one of the turnaround races 9 of the respective side of the cage 2. The balls are likewise radially outwardly guided in the return race 9 by the outwardly curved bottom of the bottom section 11. In this embodiment of the invention, however, there are no axially extending return recesses machined in the cylindrical bore of the outer sleeve 1. Instead of this, symmetrically circumferentially distributed axially extending return track recesses 23 for the unloaded balls of each row are provided on the otherwise cylindrical shaft 14. These return recesses 23 are formed as simple machined flats on the shaft 14.

Upon rotation of the shaft 14 in one or the other direction the loaded balls 4 of one of the two axially extending guides 7, 8 of each row are alternately brought in alignment with return track recess 23 of the shaft 14 and thereby loaded. At the same time the corresponding other guide 8 of the unloaded balls 3 is moved between the cylindrical bore of the outer sleeve 1 in one of the cylindrical sections of the shaft 14, so that these balls 3 can transmit radial loading from the shaft 14 to the outer ring 1 assembled in a housing (not shown). If the shaft 14 is axially moved in one or the other direction in operation relative to the outer sleeve 1, the loaded balls 3 roll in the longitudinal direction between the cylindrical section of the shaft 14 and the cylindrical race 5 of the outer sleeve 1.

While the invention has been disclosed and described with reference to a limited number of embodiments, it will be apparent that variations and modifications may be made therein, and it is intended in the following claims to cover each such variation and modification as falls within the true spirit and scope of the invention.

What is claimed is:

1. In a ball bearing for longitudinal and rotational movement on a shaft, and having circumferentially distributed endless rows of balls, the bearing being comprised of an outer sleeve with axially extending concentric cylindrical races in the bore of the outer sleeve for loaded balls, the races terminating at both ends in annular radial turnaround recesses in the bore of the outer sleeve, and a sleeve-shaped cage rotatably positioned in the bore of the outer sleeve, the cage having axially extending guides for the loaded and unloaded balls, the guides being interconnected in pairs by radially outwardly open semi-circular turnaround guides, so that axially extending return recesses for the unloaded balls of each row are formed between each pair of cylindrical races for the loaded balls, either in the cylindrical bore of the outer sleeve or on the surface of the cylindrical shaft, the improvement wherein the cage is held at its two ends by an end ring mounted on the cage and having an outer section radially covering the turnaround guides of the cage.

2. The ball bearing according to claim 1 wherein the outer section of each end ring radially projects into the respective turnaround recess in the bore of the outer sleeve and its axially inner facing surface slides on the axially inward shoulder surface of one of the turnaround recesses of the outer sleeve.

3. The ball bearing according to claim 1 wherein a narrow sealing space is formed between the outer surface of the outer section of each end ring and the respective turnaround recess in the bore of the outer sleeve.

4. The ball bearing according to claim 1 wherein the turnaround recesses are cylindrical axially outwardly open recesses in the bore of the outer sleeve.

5. The ball bearing according to claim 1 wherein each end ring is made of an elastic material and has a radial projection formed to snap with an interference fit into a corresponding groove in the outer surface of the cage.

6. The ball bearing according to claim 1 wherein a radially throughgoing filling opening for inserting the balls is machined in the outer sleeve in the region of one of the turnaround guides of the cage.

* * * * *

UNITED STATES PATENT AND TRADEMARK OFFICE
CERTIFICATE OF CORRECTION

PATENT NO. : 4,511,188

DATED : April 16, 1985

INVENTOR(S) : LOTHAR WALTER, ET AL

It is certified that error appears in the above-identified patent and that said Letters Patent is hereby corrected as shown below:

Column 3, line 37-38, delete "The guides 7, 8 which narrow inwardly guide surfaces in a known manner" and insert -- The guides 7, 8 have guide surfaces which narrow inwardly in a known manner --.

Signed and Sealed this

First Day of July 1986

[SEAL]

Attest:

DONALD J. QUIGG

Attesting Officer

Commissioner of Patents and Trademarks